United States Patent
Matsuura et al.

[11] Patent Number: 5,303,353
[45] Date of Patent: Apr. 12, 1994

[54] DATA TRANSFER SYSTEM

[75] Inventors: Yoshinori Matsuura; Shinichi Uramoto; Tetsuya Matsumura, all of Hyogo, Japan

[73] Assignee: Mitsubishi Denki Kabushiki Kaisha, Tokyo, Japan

[21] Appl. No.: 862,660

[22] Filed: Apr. 1, 1992

[30] Foreign Application Priority Data

Apr. 3, 1991 [JP] Japan .................... 3-071258

[51] Int. Cl.[5] ........................... G06F 13/38
[52] U.S. Cl. .................. 395/325; 364/DIG. 1; 364/240.1; 364/247; 364/247.8; 364/254; 364/254.1; 364/240.2
[58] Field of Search .................. 395/325, 425

[56] References Cited

U.S. PATENT DOCUMENTS

| | | | |
|---|---|---|---|
| 4,361,869 | 11/1982 | Johnson et al. | 395/425 |
| 4,424,561 | 1/1984 | Stanley et al. | 395/425 |
| 4,897,783 | 1/1990 | Nay | 395/425 |

Primary Examiner—Debra A. Chun
Attorney, Agent, or Firm—Lowe, Price, LeBlanc & Becker

[57] ABSTRACT

A data bus has a bit length of 2 words, and is divided into two bit groups, each of which corresponds to one word. Therefore, the data bus can simultaneously transfer data of two words. A register, a data operation part of a CPU, a RAM and a ROM is connected to the data bus. Even if there is generated data of two words to be transferred in these registers, the data operation part, the RAM and the ROM, the data bus can simultaneously transfer the data. In order to prevent conflict of data on the data bus, there are provided a bus driver, a multiplexer and a bus selector.

5 Claims, 14 Drawing Sheets

DATA TRANSFER SYSTEM

BACKGROUND OF THE INVENTION

1. Field of the Invention

The present invention relates to a data transfer system, and particularly to a data transfer system capable of simultaneously transferring data of multiple words.

2. Description of the Background Art

FIG. 13 is a block diagram showing an example of a conventional data transfer system. In FIG. 13, a data bus 1 having a bit width of 16 bits performs data transfer between registers 2a and 2b, a data memory 4 and a data operation part 5. Each of the registers 2a and 2b can store data of one word (i.e., 16 bits in the example). The registers 2a and 2b directly receive write data transmitted through the data bus 1. Data read from the registers 2a and 2b is sent to the data bus 1 through bus drivers 3a and 3b, respectively. The bus drivers 3a and 3b are controlled by control signals C9 and C10, respectively. To the data bus 1 is connected a data operation part 5. The data operation part 5 forms, for example, a part of a CPU (central processing unit), and can store the data of one word. To the data bus 1 is also connected a data memory 4. The data memory 4 includes memory areas M(0)-M(n) which are n+1 in number, and the data of one word can be stored in each memory area. Therefore, the data memory 4 can store data of n+1 words. In the prior art shown in FIG. 13, the data memory 4 is formed of a RAM (random access memory) which allows read and write.

FIG. 14 is a circuit diagram showing a specific construction of the bus driver 3a in FIG. 13. In the figure, the bus driver 3a includes n-channel MOS transistors 31 and 32 which are connected in series between the data bus 1 and the ground. The transistor 31 has a gate receiving the control signal C9. The transistor 32 has a gate receiving an inverted signal of a read output of the register 2a sent from an inverter IN.

In a bus driver 3a shown in FIG. 14, when the read data of the register 2a is at an H-level, a signal at an L-level, which is an inverted signal of the above read data is applied from the inverter IN to the gate of the transistor 32. Therefore, the transistor 32 is turned on. In this state, when the register 2a is selected and the control signal C9 is activated to be at the H-level, the transistor 31 is turned on. Therefore, a potential of the precharged data bus 1 is pulled down to the ground level through the transistors 31 and 32. That means that the potential of the data bus 1 is brought to the ground level, i.e., the L-level, and the output data of the register 2a is read to the data bus 1. Conversely, when the read data of the register 2a is at the H-level, the signal at the L-level which is an inverted signal thereof is supplied to the gate of the transistor 32. Therefore, the transistor 32 is turned on. In this state, even when the register 2a is selected and the control signal C9 is activated (i.e., brought to the H-level) to turn on the transistor 31, the potential of the precharged data bus 1 is not pulled down to the ground potential through the transistor 32. Therefore, the potential of the data bus 1 remains at the potential set by the precharging, i.e., at the H-level, which means that the output of the register 2a is read to the data bus 1. On the other hand, when the control signal C9 is active (i.e., at the L-level), the transistor 31 is in the OFF state. Therefore, the potential change of the output of the register 2a is not sent to the data bus 1. When the register 2a is not selected and the control signal C9 is inactive, the output data of the register 2a is not read to the data bus 1.

The bus driver 3b in FIG. 13 has the same construction as the bus driver 3a in FIG. 14, and operates in the same manner.

A data transfer operation in the conventional data transfer system shown in FIG. 13 will be described below.

(1) A data transfer operation from the register 2a or 2b to the data memory 4:

It is assumed that the data memory 4 is writable, and arbitrary addresses are selected in this operation. Since the bit width of the data bus 1 and the bit width of one memory area of the data memory 4 are equal to the bit widths of the respective registers 2a and 2b, the output data of the register 2a or 2b is transferred through the bus driver 3a or 3b and the data bus 1 to the data memory 4. In this operation, if the control signal C9 has been activated by a data transfer instruction from the register 2a to the data memory 4, the data read from the register 2a is transferred to the data memory 4 through the bus driver 3a and the data bus 1. On the other hand, if the control signal C10 has been activated by a data transfer instruction from the register 2b to the data memory 4, the data read from the register 2b is transferred to the data memory 4 through the bus driver 3b and the data bus 1.

(2) A data transfer operation from the data memory 4 to the register 2a or 2b:

It is assumed that the data memory 4 is readable, and arbitrary addresses, e.g., of memory areas M(0) and M(1) are selected in this operation. Data of one word read from the memory area M(0) in the data memory 4 is transferred to the register 2a through the data bus 1. Then, data read from the memory area M(1) in the data memory 4 is transferred to the register 2b through the data bus 1.

(3) A data transfer operation to the data operation part 5:

In this operation, data read from an arbitrary memory area in the data memory, data read from the register 2a, or data read from the register 2b is transferred to the data operation part 5 through the data bus 1.

As described above, since each register, the data operation part, the data bus and one memory area in the data memory have the same bit width in the conventional data transfer system, data of only one word can be transferred between each of the registers, the data operation part and the data memory in one operation. Therefore, if there is generated data of multiple words to be transferred, the transfer operation for one word must be repeated, resulting in a disadvantage that the data transfer requires a long time.

SUMMARY OF THE INVENTION

Accordingly, it is an object of the invention to provide a data transfer system which can transfer data in a short time even if there is generated data of multiple words to be transferred.

According to the invention, a data transfer system capable of simultaneously transferring data of multiple words, each of which consists of m bits, comprises a data bus set, a plurality of register means, memory means, a plurality of read data supplying means, a plurality of write data supplying means and connecting means. The data bus set includes divided bit groups which are k in number and each have m bits, the number k being an integer of 2 or more. The data bus set can simultaneously transfer data of words which are k in number. Each register means can store data of at least one word. The memory means is divided into k blocks, each of which can store data of one word at the same address. Each read data supplying means is provided for each register means, and selectively supplies data read from the corresponding register means to one of the divided bit groups of the data bus. Each write data supplying means is provided for each register means, and supplies write data, which is transferred through one of the bit groups in the data bus, to the corresponding register means. The connecting means connects an arbitrary one of the blocks of the memory means to an arbitrary one of the bit groups of the data bus.

In the present invention, since the data bus set has a bit width for k words, the data of k words can be simultaneously transmitted. Therefore, if there is generated data of multiple words to be transferred between the register means and the memory means, this data is collectively transferred by the data bus, so that time for the data transfer can be reduced. In this operation, the read data supplying means, the write data supplying means and the connecting means determine bit bus groups of the data bus to be used by the respective register means and bit groups of the data bus to be used by the memory means so as to prevent conflict of the word data on the data bus.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
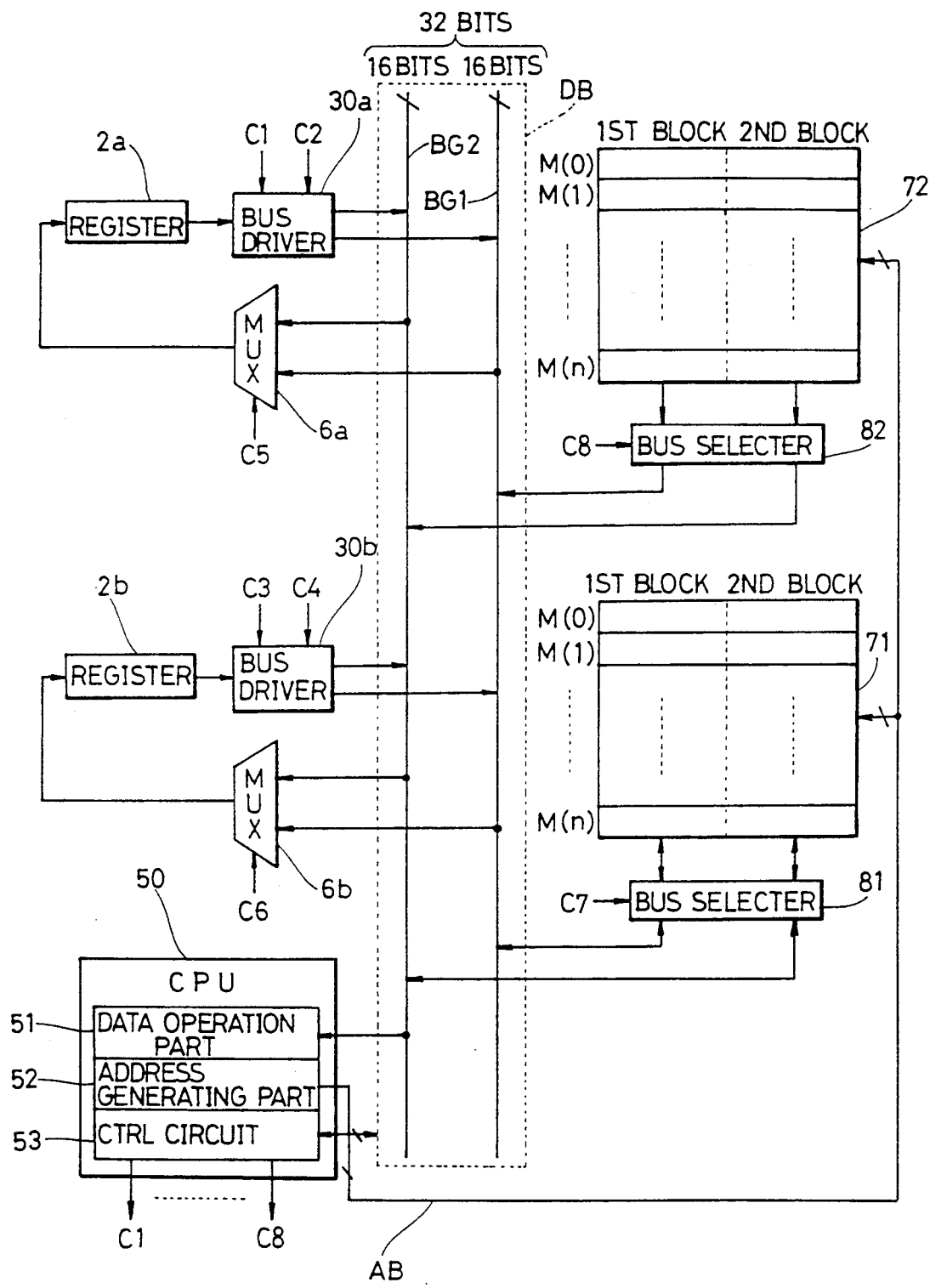
FIG. 1 is a block diagram showing an example of a multiprocessor system using a data transfer system of an embodiment of the invention.

FIG. 1 is a block diagram showing an example of a multiprocessor system to which a data transfer system of an embodiment of the invention is applied. In FIG. 1, there is provided one data bus set or data bus DB for transferring data. The data bus DB has a bit width for multiple words so as to enable simultaneous transmission of the data of multiple words. In the embodiment shown in FIG. 1, the data bus DB has a bit width of 32 bits, and thus can simultaneously transmit the data of 2 words, each word having 16 bits. The data bus DB is divided into a plurality of bit groups. Each group has a bit number corresponding to one word. In the embodiment shown in FIG. 1, the data bus DB is divided into an upper bit group BG1 and a lower bit group BG2.

There is also provided a register 2a as well as a bus driver 30a and a multiplexer 6a connected thereto. The bus driver 30a is responsive to control signals C1 and C2 applied from a control circuit 53 of a CPU 50 described later to supply output data of the register 2a selectively to the bit groups BG1 and BG2 of the data bus DB. The multiplexer 6a is responsive to a control signal C5 of 2 bits, which is also supplied from a control circuit 53 of the CPU 50, to selectively supply write date, which is transmitted from the bit group GB1 or GB2 of the data bus DB, to the register 2a. Similarly, there is provided a register 2b as well as a bus driver 30b and a multiplexer 6b connected thereto. The bus driver 30a is responsive to control signals C3 and C4 applied from a control circuit 53 of a CPU 50 to supply output data of the register 2b selectively to the bit groups BG1 and BG2 of the data bus DB. The multiplexer 6b is responsive to a control signal C6 of at least two bits, which is supplied from the control circuit 53 of the CPU 50, to selectively supply write date, which is transmitted from the bit group GB1 or GB2 of the data bus DB, to the register 2b.

In the embodiment shown in FIG. 1, the data memory is formed of a RAM 71 and a ROM 72. The RAM 72 includes memory areas M(0)-M(n) which are n+1 in number. Each memory area is divided into blocks, of which number is equal to the number of the bit groups contained in the data bus DB. In the embodiment shown in FIG. 1, since the data bus DB has the two bit groups BG1 and BG2, each memory area of the RAM 71 is divided into first and second blocks. Each block of each memory area has a bit width of 16 bits and thus can store data of one word. The ROM 72 is divided into blocks in a similar fashion. A bus selector 81 is disposed between the RAM 71 and the data bus DB. The bus selector 81 is responsive to a control signal C7 of multiple bits, which is applied from the control circuit 53 of the CPU 50, to arbitrarily select connecting states between the respective blocks of the RAM 71 and the respective bit groups of the data bus DB. Similarly, a bus selector 82 is disposed between the ROM 72 and the data bus DB. This bus selector 82 is responsive to a control signal C8 of multiple bits, which is applied from the control circuit 53 of the CPU 50, to arbitrarily select connecting states between the respective blocks of the ROM 72 and the respective bit groups of the data bus DB.

The CPU 50 includes a data operation part 51, an address generating part 52 and a control circuit 53. The data operation part 51 includes components such as an ALU, a multiplier and a data register, and performs various logical operations. The data register in the data operation part 51 stores various data transferred through the data bus DB. Thus, the data operation part 51 is connected to one of the bit groups of the data bus DB. In the embodiment shown in FIG. 1, the data operation part 51 is connected to the bit group BG2 of the data bus DB. The address generating part 52 generates addresses of data memories used in this microprocessor system. Thus, the address generating part 52 supplies address data to the RAM 71 and ROM 72 through a data bus AB. The control circuit 53 generates various control signals for controlling operations of the circuits in the microprocessor system. In the embodiment shown in FIG. 1, the control circuit 53 generates various signals among which the above described control signals C1-C8 are particularly interested in this invention. The CPU 50 is further connected to the data bus DB for supplying and receiving the data to and from external equipments (not shown).

In the embodiment shown in FIG. 1, the registers 2*a* and 2*b* as well as the data register in the data operation part 51 each can store the data of one word (16 bits).

Figure 2:
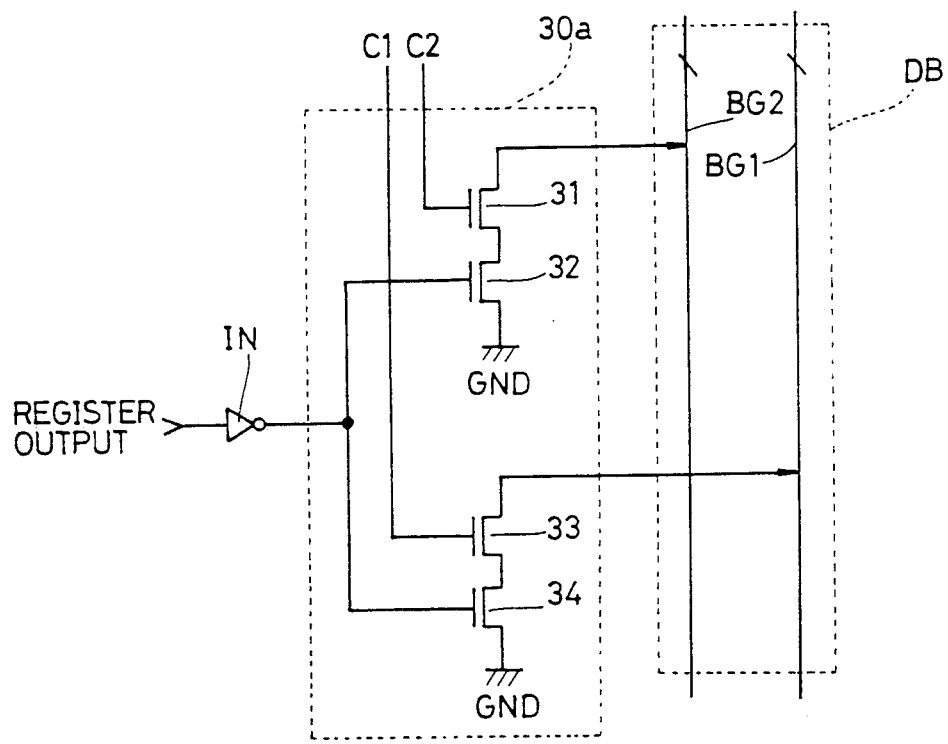
FIG. 2 is a circuit diagram showing a specific construction of a bus driver in FIG. 1.
Figure 14:
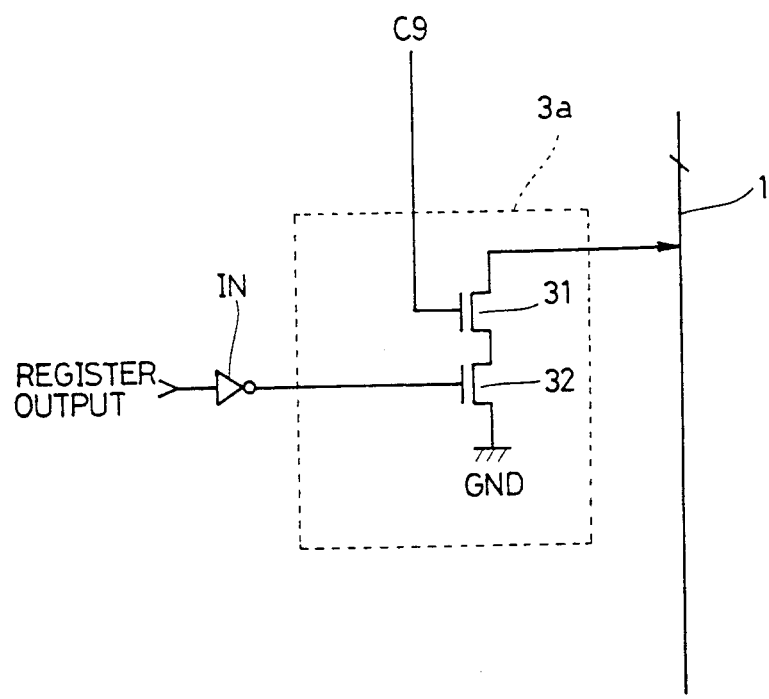
FIG. 14 is a circuit diagram showing a specific construction of a bus driver in FIG. 13.

FIG. 2 is a circuit diagram showing a specific construction of the bus driver 30*a* in FIG. 1. In FIG. 2, the bus driver 30*a* comprises n-channel MOS transistors 33 and 34 which are connected in series between the bit group BG1 of the data bus DB and the ground. The bus driver 30*b* also comprises n-channel MOS transistors 31 and 32 which are connected in series between the bit group BG2 of the data bus DB and the ground. The transistors 33 and 31 have gates to which the control signals C1 and C2 are applied. The transistors 32 and 34 have gates to which inverted signals of the output data of the register 2*a* are applied from an inverter IN. Thus, the bus driver 30*a* has a construction corresponding to a construction in which the bus driver 3*a* shown in FIG. 14 is provided for each bit group of the data bus DB.

FIGS. 3-12 shows a flow of the data in data transfer operations of the embodiment shown in FIG. 1. Now, the operations for the data transfer of the embodiment shown in FIG. 1 will be described hereinafter with reference to FIGS. 3-12.

Figure 3:
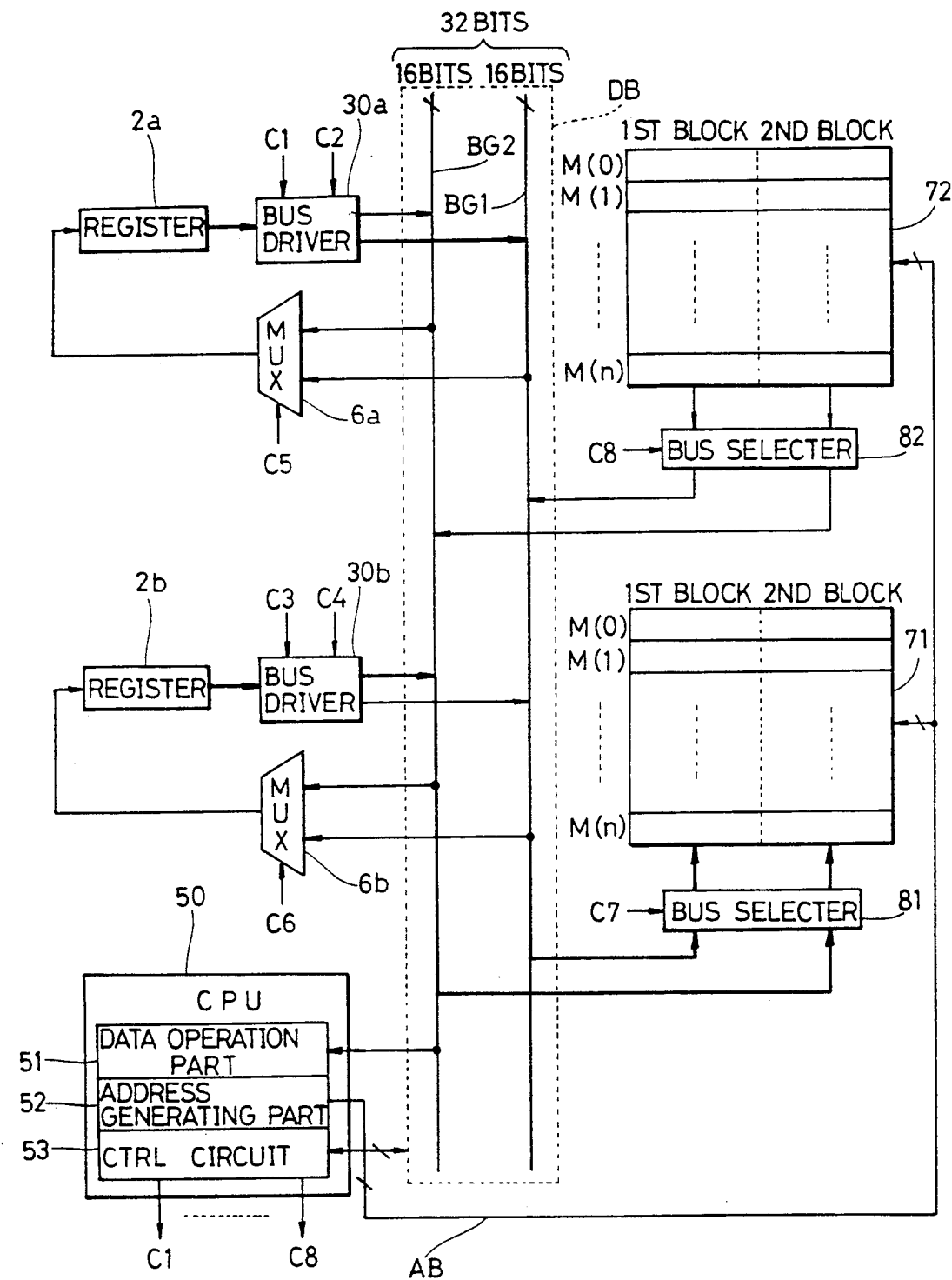
FIG. 3 is a diagram showing a flow of data in a case that data stored in registers 2a and 2b is transferred to first and second blocks in a RAM 71 in an embodiment shown in FIG. 1.

(1) An operation for transferring the data from the registers 2*a* and 2*b* to the RAM 71:

Referring to FIG. 3, thick line represents a flow of the data in a case that the register 2*a* transfers the data to the first block of the RAM 71 and the register 2*b* transfers the data to the second block of the RAM 71. In this operation, the control signal C1 is active (i.e., at the H-level), and the control signal C2 is inactive (i.e., at the L-level). Therefore, in the bus driver 30*a*, the transistor 31 is in the OFF state and the transistor 33 is in the ON state. Consequently, the output data of the register 2*a* is read through the transistors 34 and 33 in the bus driver 30*a* to the bit group BG1 of the data bus DB. Since the transistor 31 is in the OFF state, the output data of the register 2*a* is not transmitted to the bit group BG2 of the data bus DB. In this operation, the control signal C3 is inactive and the control signal C4 is active. Therefore, in the bus driver 30*b*, the transistor 31 is in the ON state and the transistor 33 is in the OFF state. Consequently, the output data of the register 2*b* is read through the transistors 32 and 31 to the bit group BG2 of the data bus DB. Since the transistor 33 is in the OFF state, the output data of the register 2*b* is not transmitted to the bit group BG1 of the data bus DB. During this operation, the bus selector 81 which is responsive to the control signal C7 of multiple bits has connected the bit group BG1 of the data bus DB to the first block of the RAM 71, and also has connected the bit group BG2 to the second block of the RAM 71. Therefore, the output data of the register 2*a* is transferred through the bus driver 30*a*, the bit group BG1 of the data bus DB and the bus selector 81 to the first block of the RAM 71. Also, the output data of the register 2*b* is transferred through the bus driver 30*b*, the bit group BG2 of the data bus DB and the bus selector 81 to the second block of the RAM 71. The data transferred to the RAM 71 is written in a memory area of an address which is currently designated by the CPU 50.

Figure 4:
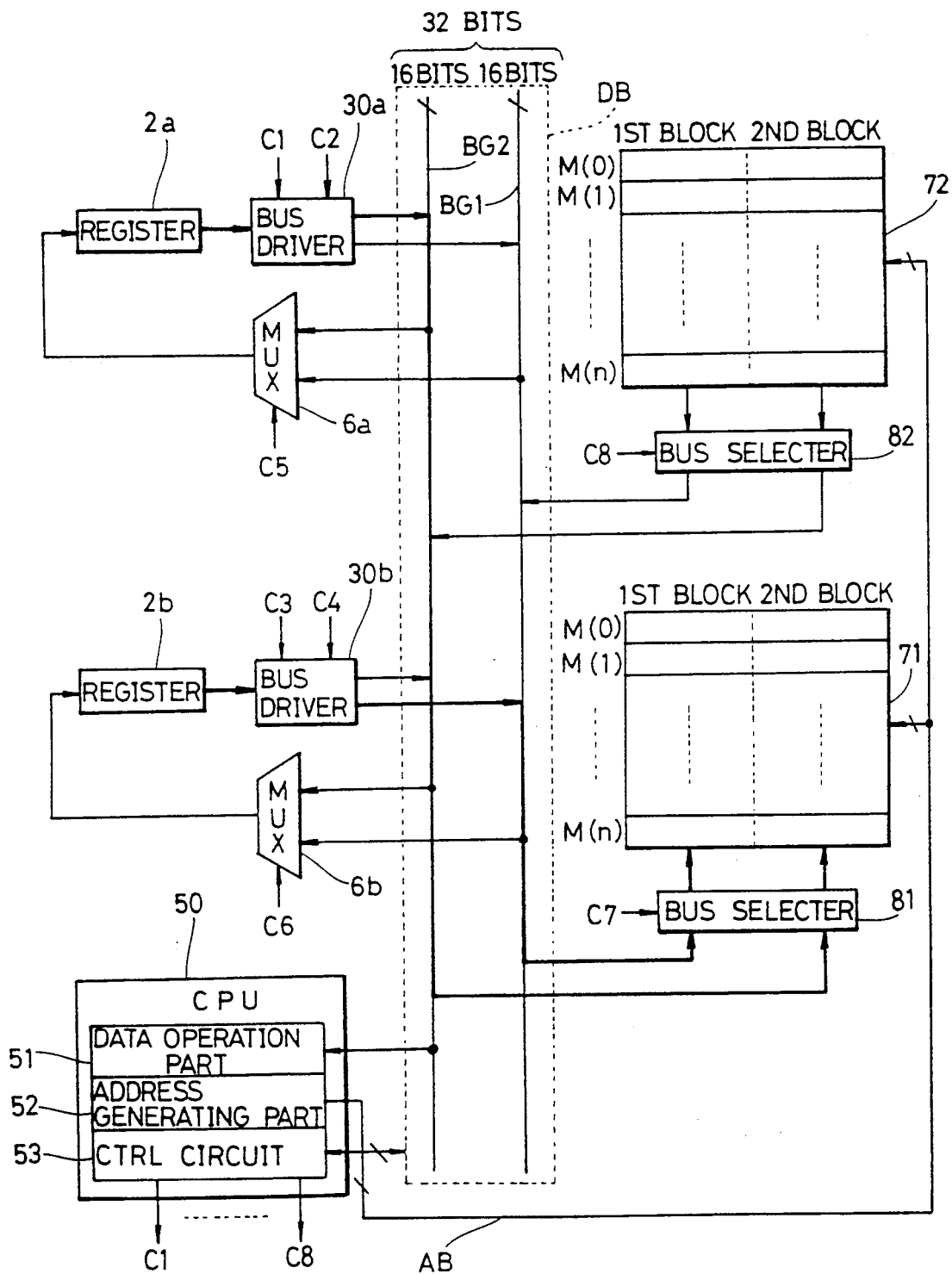
FIG. 4 is a diagram showing a flow of data in a case that data stored in registers 2a and 2b is transferred to second and first blocks in a RAM 71 in an embodiment shown in FIG. 1.

Referring to FIG. 4, thick line represents a flow of the data in a case that the stored data of the register 2*a* is transferred to the second block of the RAM 71 and the stored data of the register 2*b* is transferred to the first block of the RAM 71. In this operation, the control signal C1 is inactive, and the control signal C2 is active. The control signal C3 is active and the control signal C4 is inactive. Therefore, the bus driver 30*a* supplies the output data of the register 2*a* to the bit group BG2 of the data bus DB, and the bus driver 30*b* supplies the output data of the register 2*b* to the bit group BG1 of the data bus DB. The bus selector 81 connects the bit group BG1 of the data bus DB to the first block of the RAM 71 and connects the bit group BG2 of the data bus DB to the second block of the RAM 71. Therefore, the stored data of the register 2*a* is transferred through the bus driver 30*a*, the bit group BG2 of the data bus DB and the bus selector 81 to the second block of the RAM 71. The stored data of the register 2*b* is transferred to the bus driver 30*b*, the bit group BG1 of the data bus DB and the bus selector 81 to the first block of the RAM 71. The data transferred to the RAM 71 is written in the first block and specifically in a memory area of an address which is currently designated by the CPU 50.

Figure 5:
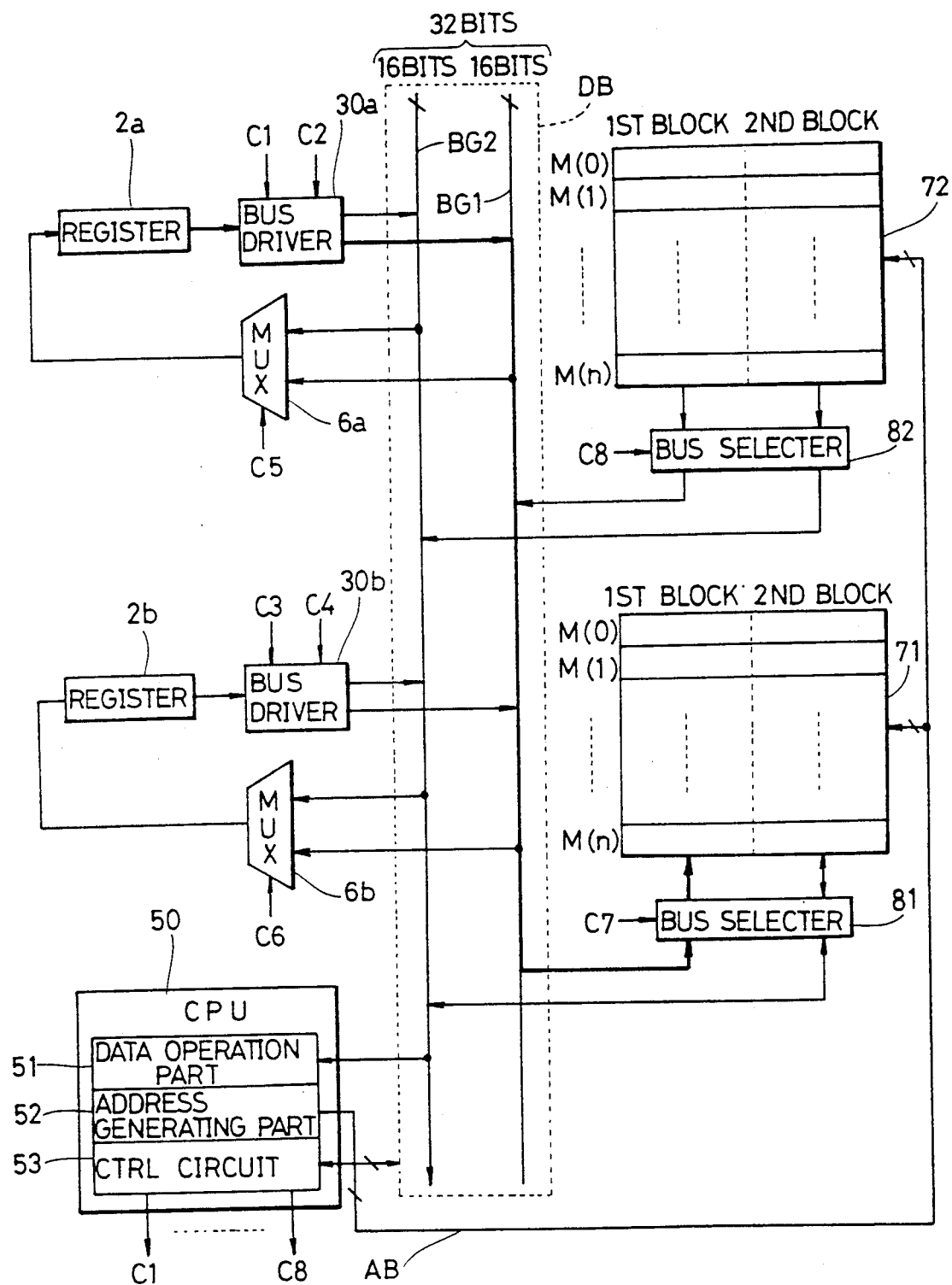
FIG. 5 is a diagram showing a flow of data in a case that data stored in a register 2a is transferred to a first block in a RAM 71 in an embodiment shown in FIG. 1.
Figure 6:
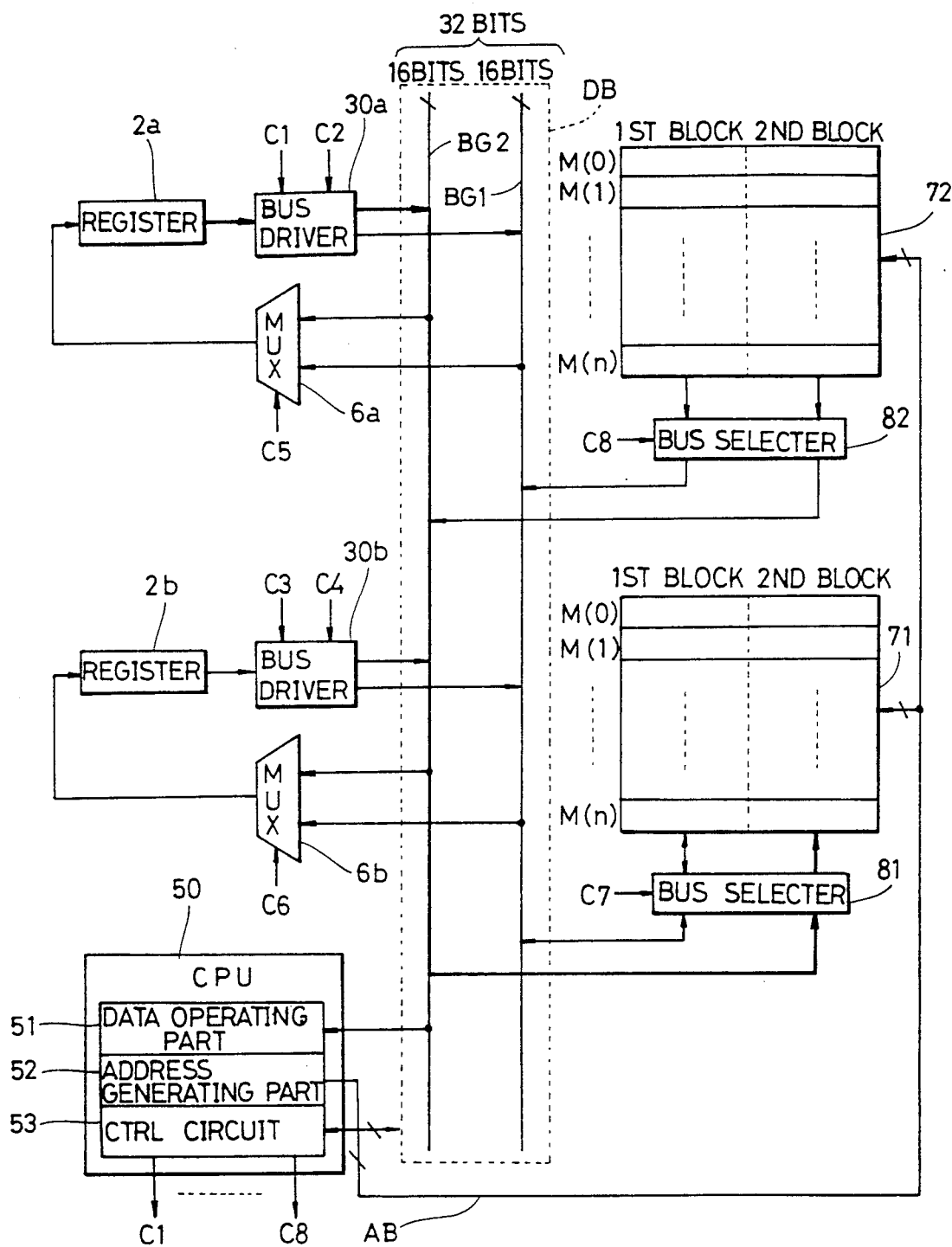
FIG. 6 is a diagram showing a flow of data in a case that data stored in a register 2a is transferred to a second block in a RAM 71 in an embodiment shown in FIG. 1.

Referring to FIG. 6, thick line represents a flow of the data in a case that the stored data of the register 2*a* is transferred to the second block of the RAM 71, which is converse to the case in FIG. 5. In this operation, the control signal C1 is inactive and the control signal C2 is active. Both the control signals C3 and C4 are inactive. Therefore, the bus driver 30*a* supplies the output data of the register 2*a* to the bit group BG2 of the data bus DB. The bus driver 30*b* does not transmit the output data of the register 2*b* to any bit group of the data bus DB. The bus selector 81 has connected only the bit group BG2 of the data bus DB to the second block of the RAM 71. Therefore, the stored data of the register 2*a* is transferred through the bus driver 30*a*, the bit group BG2 of the data bus DB and the bus selector 81 to the second block of the RAM 71. The data transferred to the RAM 71 is written in the second block and specifically in a memory area of an address currently designated by the CPU 50.

In any of the cases shown in FIGS. 3-6, the multiplexers 6a and 6b are disabled by the control signals C5 and C6, and thus do not transmit the data on the data bus DB to the registers 2a and 2b.

Figure 7:
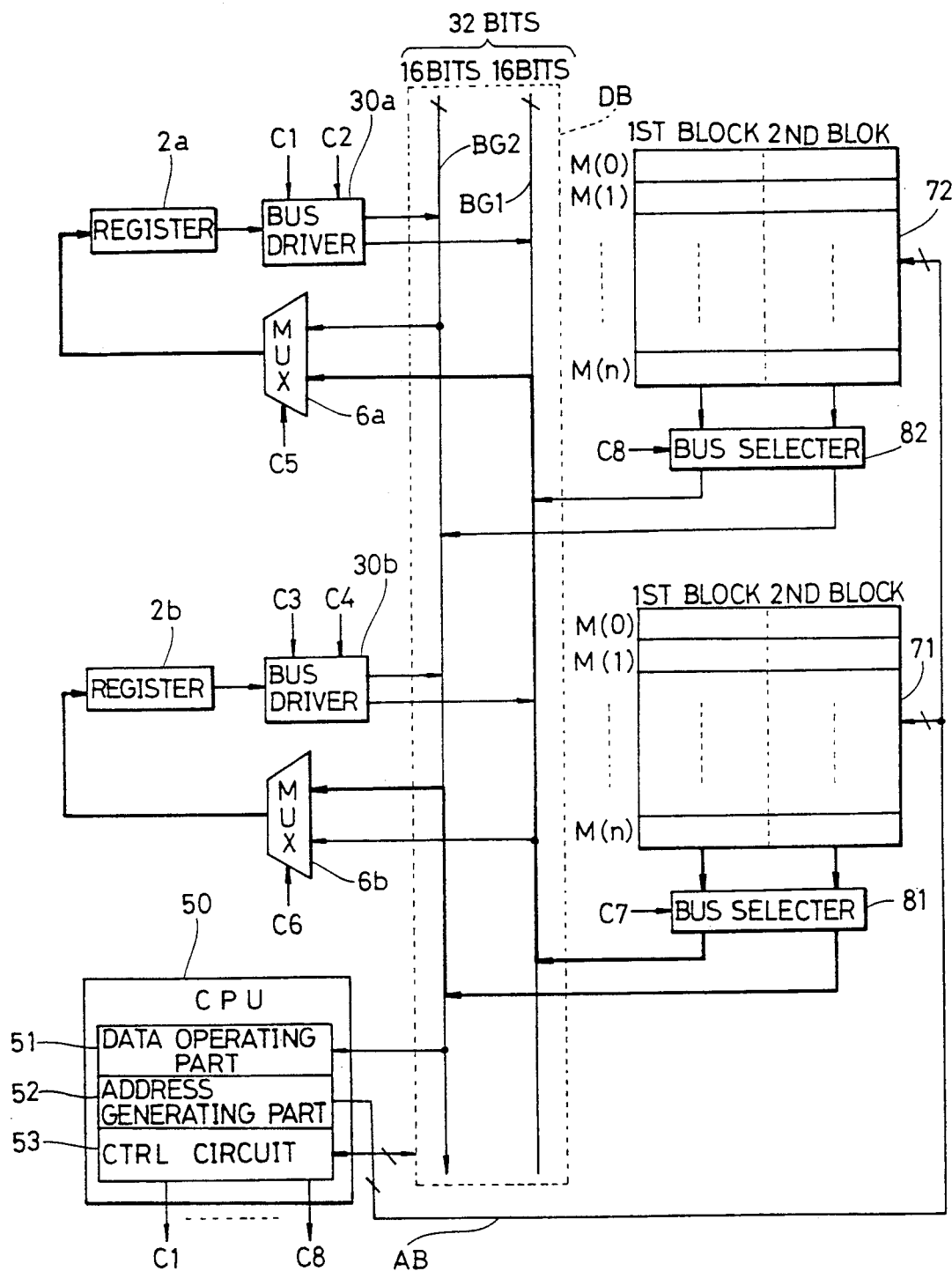
FIG. 7 is a diagram showing a flow of data in a case that data read from first and second blocks in a RAM 71 is transferred to registers 2a and 2b, respectively, in an embodiment shown in FIG. 1.

(2) An operation for transferring the data from the RAM 71 to the register(s) 2a and/or 2b:

Referring to FIG. 7, thick line represents a flow of the data in a case that the data is transferred from the first block of the RAM 71 to the register 2a and the data is transferred from the second block of the RAM 71 to the register 2b. In this operation, the bus selector 81 has connected the first block of the RAM 71 to the bit group BG1 of the data bus DB, and also has connected the second block of the RAM 71 to the bit group BG2 of the data bus DB. All the control signals C1-C4 are disabled. Therefore, both the bus drivers 30a and 30b are inactive. Meanwhile, the multiplexer 6a, which responds to the control signal C5, selects the output data of the bit group BG1 of the data bus DB and supplies it to the register 2a. The multiplexer 6b, which is responsive to the control signal C6, selects the output data of the bit group BG2 of the data bus DB and supplies it to the register 2b. Therefore, the data read from the first block and specifically from a memory area of an address designated by the CPU 50 is transferred through the bus selector 81, the bit group BG1 of the data bus DB and the multiplexer 6a to the register 2a, and the data read from an area of the same address in the second block is transferred through the bus selector 81, the bit group BG2 of the data bus DB and the multiplexer 6b to the register 2b.

Figure 8:
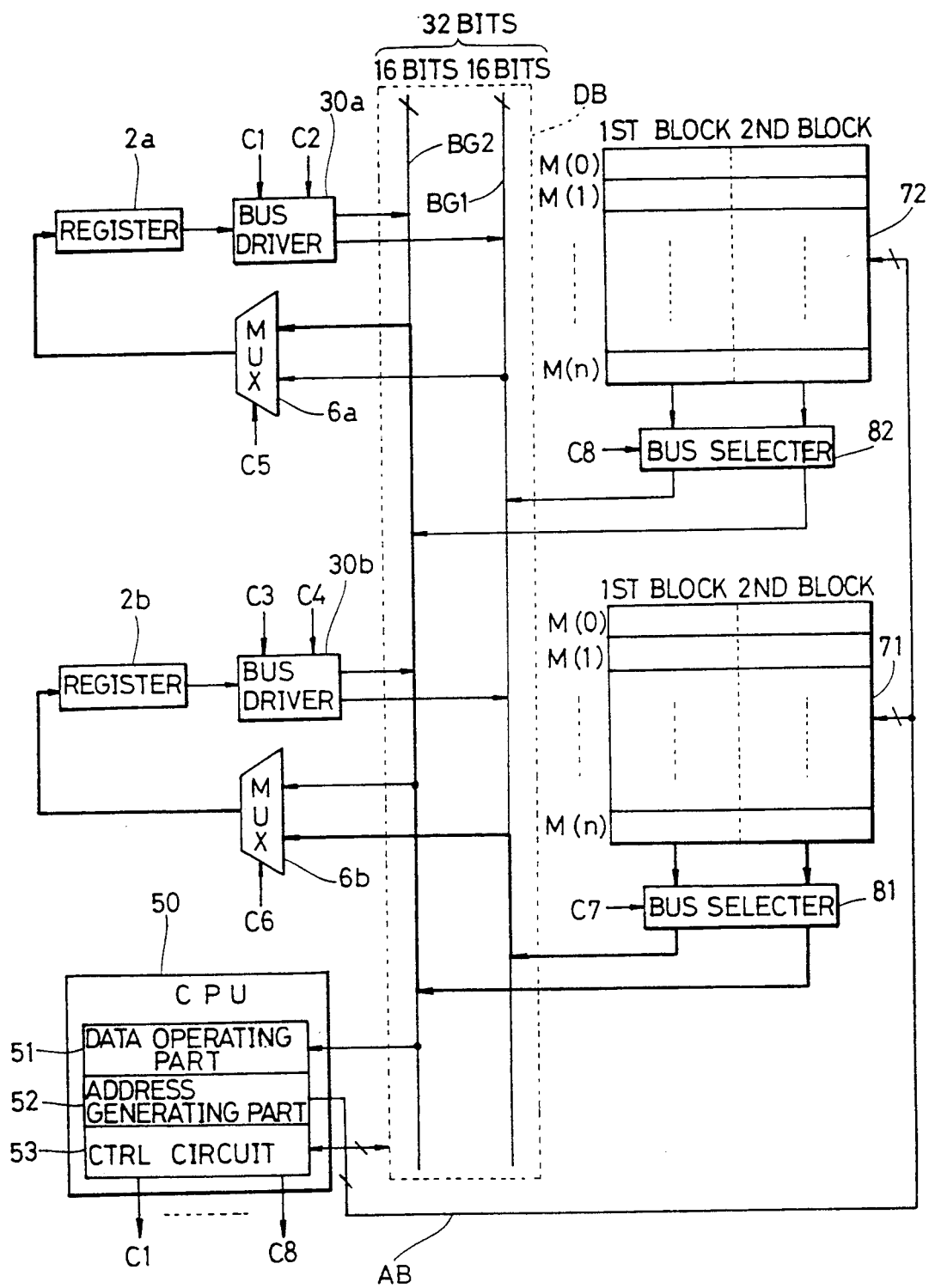
FIG. 8 is a diagram showing a flow of data in a case that data read from first and second blocks in a RAM 71 is transferred to registers 2b and 2a, respectively, in an embodiment shown in FIG. 1.

Referring to FIG. 8, thick line represents a flow of the data in a case that data read from the first block of the RAM 71 is transferred to the register 2b and the data read from the second block is transferred to the register 2a, which is converse to the case in FIG. 7. In this operation, the multiplexer 6a, which is responsive to the control signal C5, selects the output data of the bit group BG2 of the data bus DB and supplies it to the register 2a. The multiplexer 6b, which is responsive to the control signal C6, selects the output data of the bit group BG1 of the data bus DB and supplies it to the register 2b. Therefore, the data read from the first block of the RAM 71 is transferred through the bus selector 81, the bit group BG1 and the multiplexer 6b to the register 2b. Also, the data read from the second block of the RAM 71 is transferred through the bus selector 81, the bit group BG2 and the multiplexer 6a to the register 2a. Other operations are similar to those already described with reference to FIG. 7.

Figure 9:
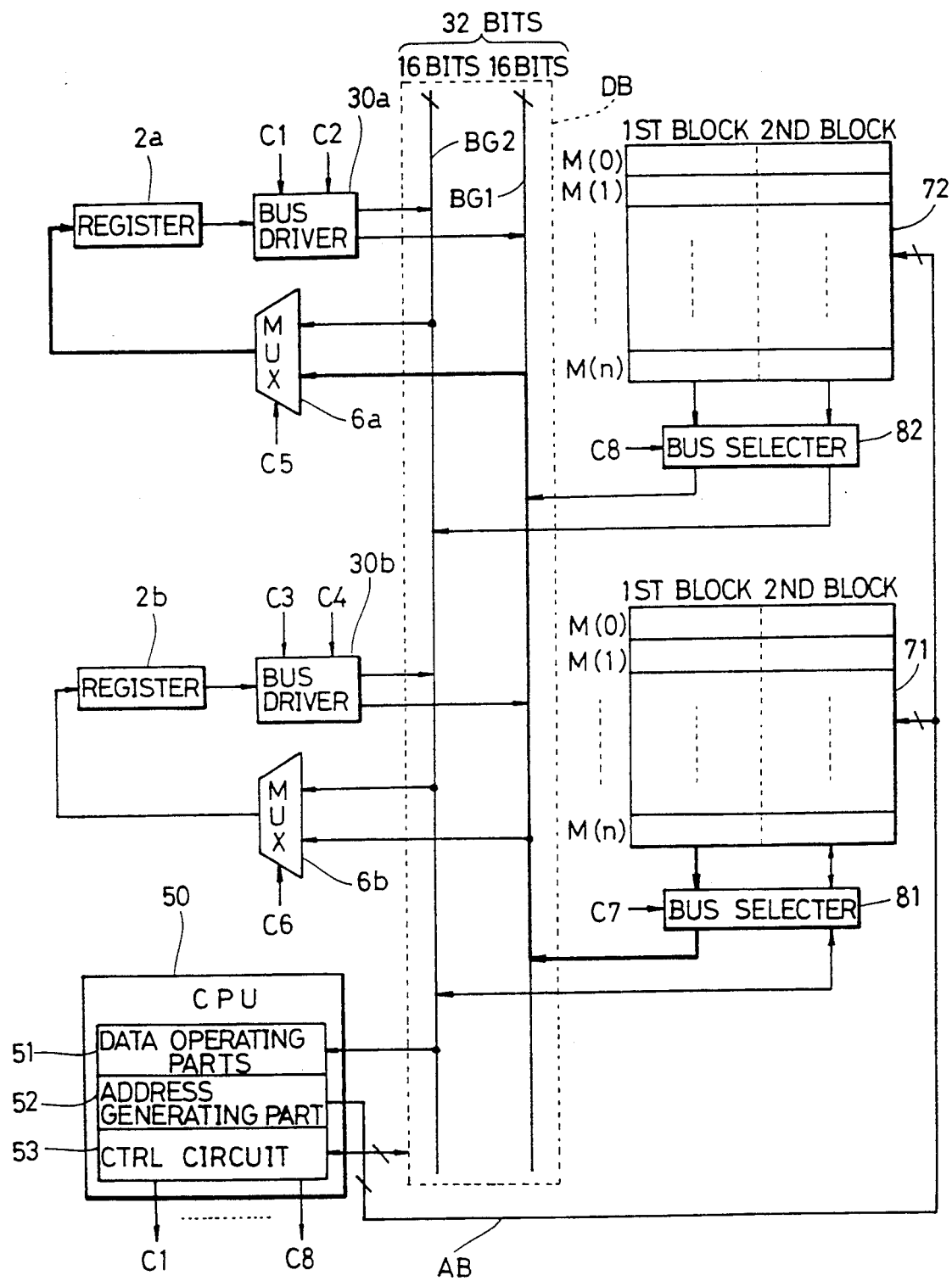
FIG. 9 is a diagram showing a flow of data in a case that data read from a first block in a RAM 71 is transferred to a register 2a in an embodiment shown in FIG. 1.

Referring to FIG. 9, thick line represents a flow of the data in a case that the data read from the first block of the RAM 71 is transferred to the register 2a. In this operation, the bus selector 81 has connected only the first block of the RAM 71 to the bit group BG1 of the data bus DB. Further, the multiplexer 6a, which is responsive to the control signal C5, selects the output data of the bit group BG1 and supplies it to the register 2a. Therefore, the data read from the first block of the RAM 71 is transferred through the bus selector 81, the bit group BG1 and the multiplexer 6a to the register 2a. In this operation, the multiplexer 6b is disabled by the control signal C6 and thus does not transmit the data on the data bus DB to the register 2b.

Figure 10:
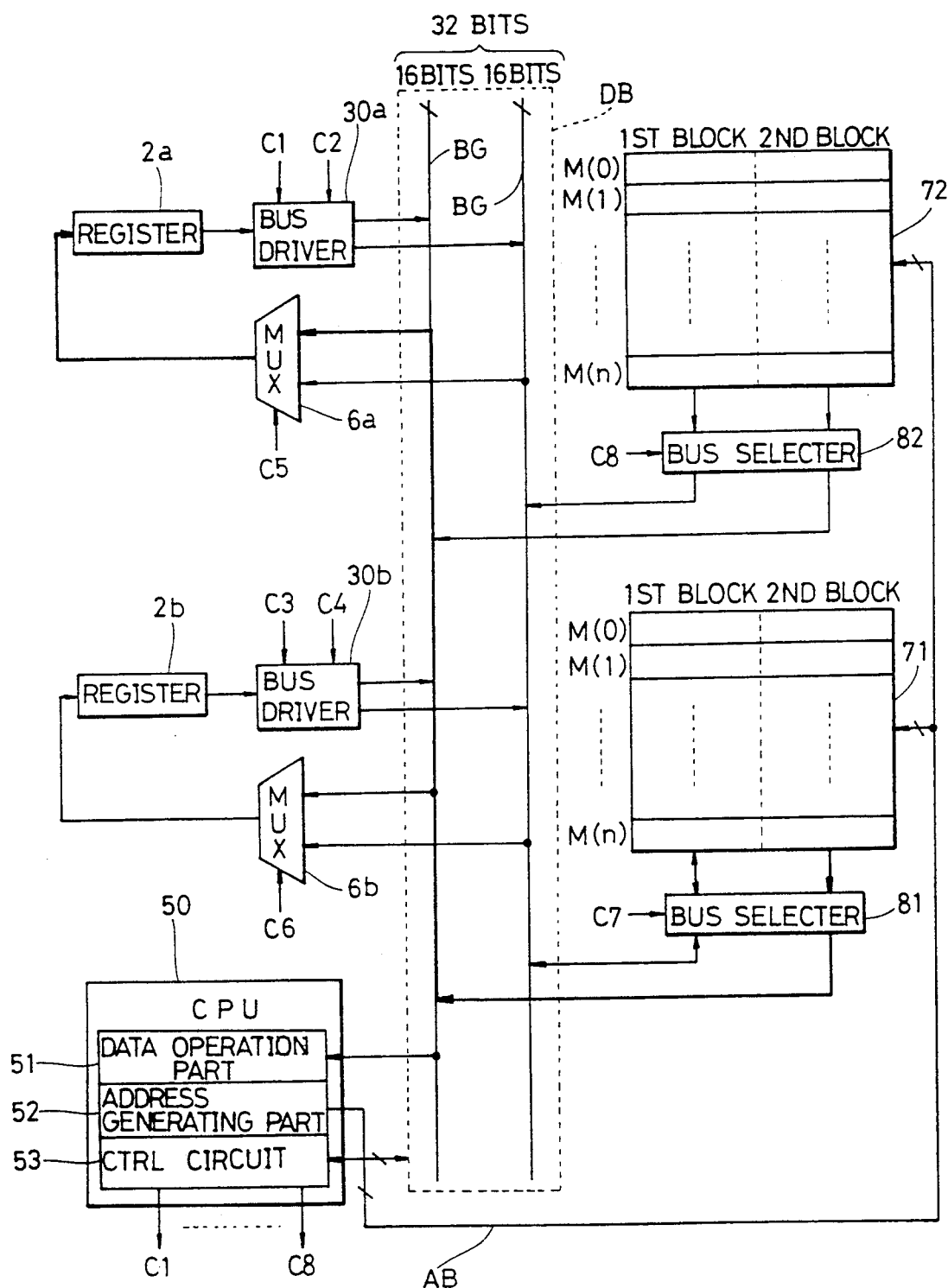
FIG. 10 is a diagram showing a flow of data in a case that data read from a second block in a RAM 71 is transferred to a register 2b in an embodiment shown in FIG. 1.

Referring to FIG. 10, thick line represents a flow of the data in a case that the data read from the second block of the RAM 71 is transferred to the register 2a, which is converse to the case shown in FIG. 9. In this operation, the bus selector 81 has connected only the second block of the RAM 71 to the bit group BG2 of the data bus DB. Further, the multiplexer 6a, which is responsive to the control signal C5, selects the output data of the bit group BG2 and supplies it to the register 2a. Therefore, the data read from the second block of the RAM 71 is transferred through the bus selector 81, the bit group BG2 and the multiplexer 6a to the register 2a. In this operation, the multiplexer 6b is disabled by the control signal C6.

Figure 11:
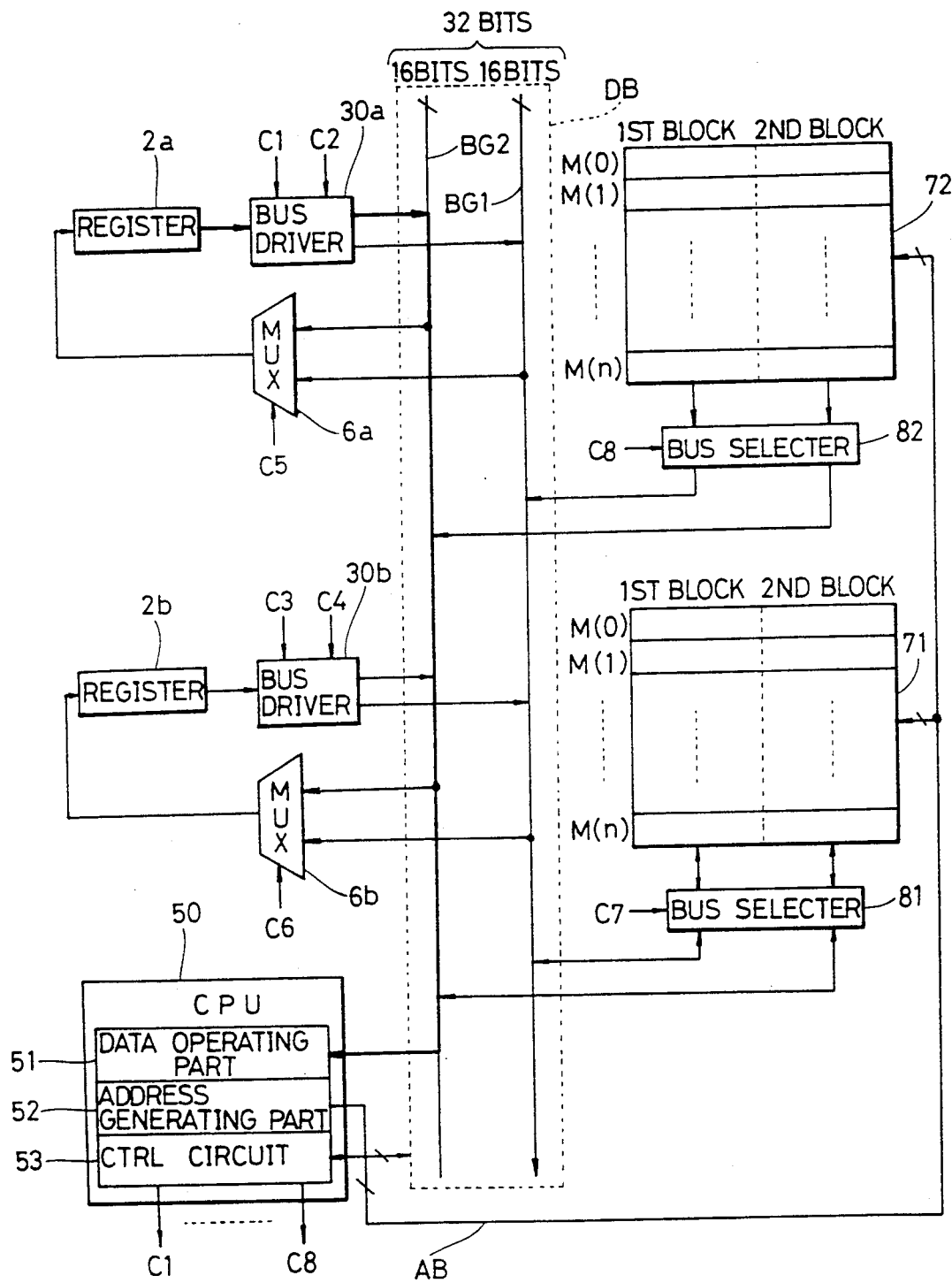
FIG. 11 is a diagram showing a flow of data in a case that data stored in a register 2a is transferred to a data operation part of a CPU 50 in an embodiment shown in FIG. 1.

(3) An operation for transferring the data to the data operation part 51 of the CPU 50:

Referring to FIG. 11, thick line represents a flow of the data in a case that the stored data of the register 2a is transferred to the data operation part 51 of the CPU 50. In this operation, the bus selector 81 disconnects the RAM 71 from data bus DB. The control signal C1 is inactive and the control signal C2 is active. Both the control signals C3 and C4 are inactive. Therefore, the bus driver 30a supplies the stored data of the register 2a to the bit group BG2 of the data bus DB. The bus driver 30b does not transmit the output data of the register 2b to the data bus DB. Therefore, the stored data of the register 2a is transferred through the bus driver 30a and the bit group BG2 to the data operation part 51 of the CPU 50. In this operation, the multiplexers 6a and 6b are disabled by the control signals C5 and C6, and thus does not transmit the data on the data bus DB to the registers 2a and 2b.

Figure 12:
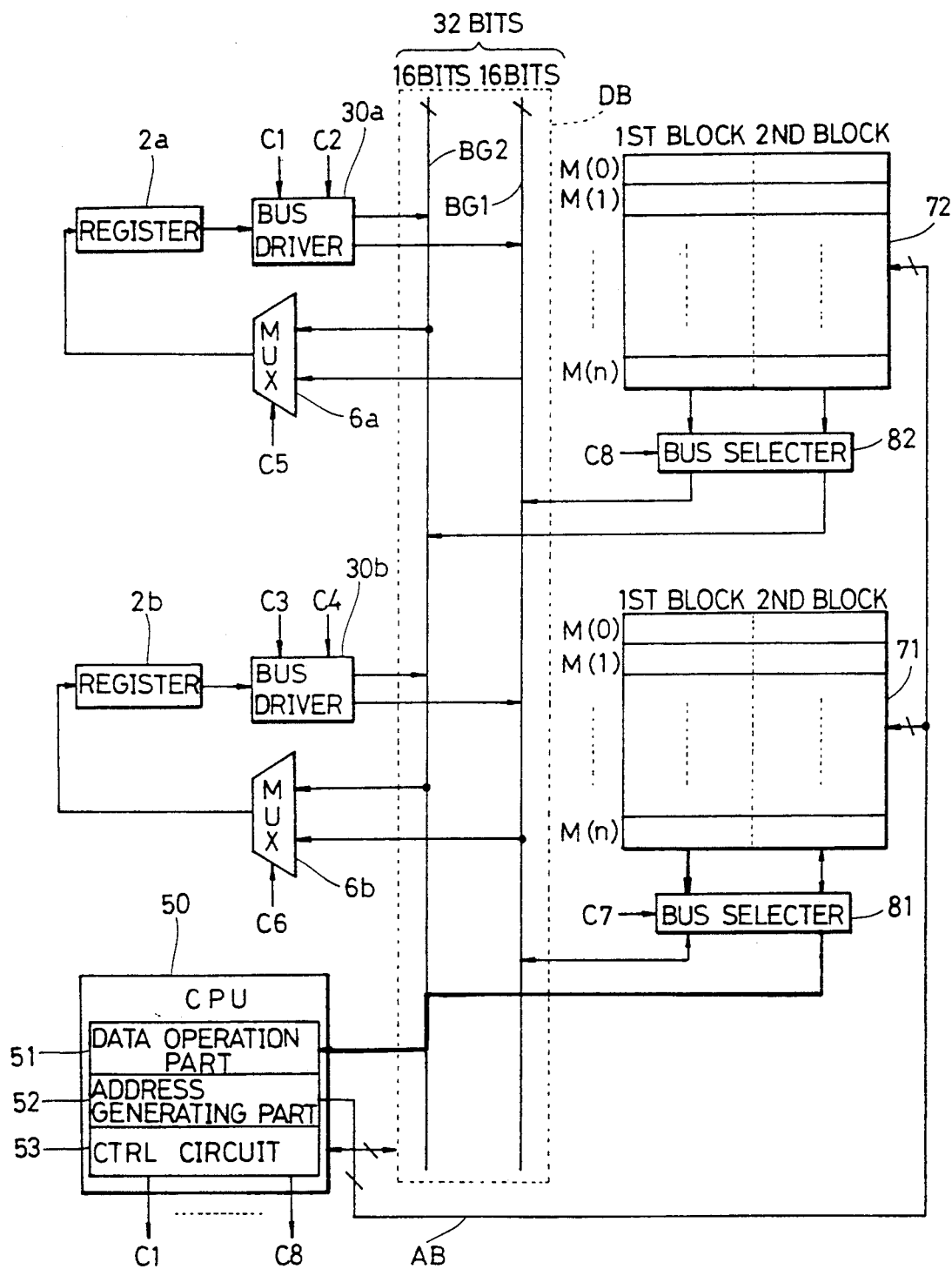
FIG. 12 is a diagram showing a flow of data in a case that data read from a first block of a RAM 71 is transferred to a data operation part 51 of a CPU 50 in an embodiment shown in FIG. 1.
Figure 13:
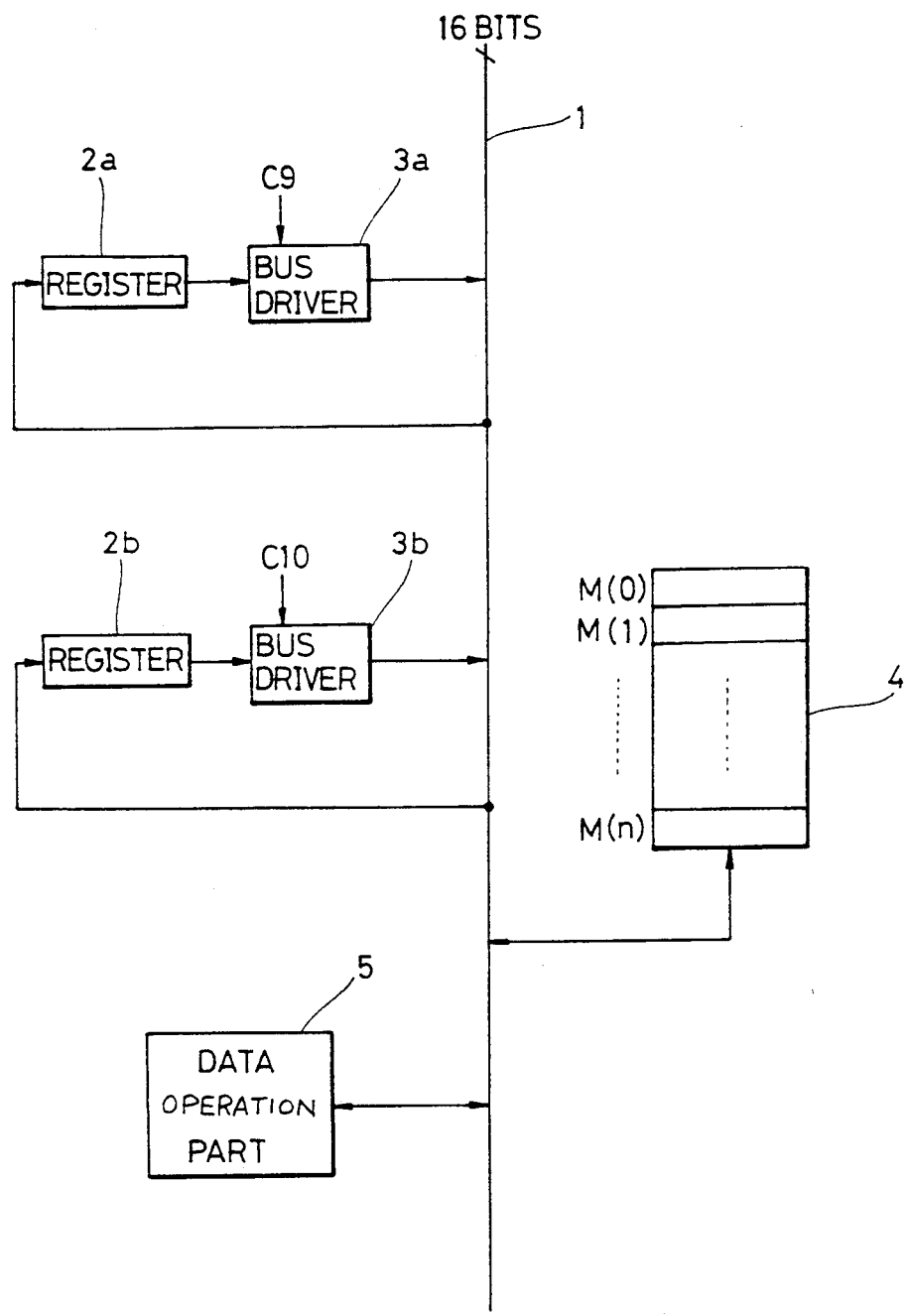
FIG. 13 is a block diagram showing an example of a data transfer system in the prior art.

Referring to FIG. 12, thick line represents a flow of the data in a case that the data read from the first block of the RAM 71 is transferred to the data operation part 51 of the CPU 50. In this operation, the bus selector 81 has connected the first block of the RAM 71 to the bit group BG2 of the data bus DB and has disconnected the second block of the RAM 71 from the data bus DB. Therefore, the data read from the first block of the RAM 71 is transferred through the bus selector 81 and the bit group BG2 to the data operation part 51 of the CPU 50. In this operation, the bus drivers 30a and 30b and the multiplexers 6a and 6b are disabled by the control signals C1-C6.

As described hereinabove, the embodiment shown in FIG. 1 allows free transfer of the data between the registers 2a and 2b, the data operation part 51 of the CPU 50 and the RAM 71, and also allows simultaneous transfer of the data of two words. The data transfer for the ROM 72 is performed similarly to that for the RAM 71. However, since the ROM 72 allows only reading of the data, the bus selector 82 controls only the transfer of the read data.

Although one word has 16 bits and the data bus DB is constructed to have the bit width of 2 words in the embodiment shown in FIG. 1, the bit number of one word may be other than 16, and the data bus DB may have a bit width of more than 2 words.

Although the embodiment shown in FIG. 1 is applied to the multiprocessor system, the data transfer system of the invention may also be applied to various systems and apparatuses requiring parallel transfer of the data, other than multiprocessor system.

According to the invention, as described hereinabove, even if there is generated data of multiple words to be transferred simultaneously, the data can be simultaneously transferred, so that a time for data transfer can be remarkably reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transfer system capable of simultaneously transferring data of multiple words, each of which consists of m bits, comprising:
   a data bus set in which each data bus is divided into k bit groups each bit group having m bits, said number k being an integer of 2 or more, said data bus set being arranged to allow simultaneous transfer of k data words;
   a plurality of register means for selecting a plurality of bit group for transfer from said data bus set, each of said register means having storage capacity of at least one word,
   memory means connected to said register means through said data bus set and divided into k blocks, each of which has storage capacity of one word;
   a plurality of read data supplying means, each of which is provided for each register means and selectively supplies data read from the corresponding register means to one of said bit groups;
   a plurality of write data supplying means, each of which is provided for each register means, and supplies write data, which is transferred through one of said bit groups in said data bus, to a corresponding register means; and
   connecting means for connecting an arbitrary one of said blocks of said memory means to an arbitrary one of said bit groups of said data bus set.

2. A data transfer system according to claim 1 wherein said memory means is a random access memory; and
   said connecting means includes read/write data distributing and supplying means, by which data of single or multiple word(s) read from the same addresses in said respective blocks of said memory means are distributed and supplied to said divided bit groups of said data bus, and by which write data of single or multiple word(s) sent through said data bus is distributed and supplied to said respective blocks of said memory means.

3. A data transfer system according to claim 1 wherein said memory means is a read-only memory; and
   said connecting means includes a read data distributing and supplying means, by which data of single or multiple word(s) read from the same addresses in said respective blocks of said memory means is distributed and supplied to said divided bit groups of said data bus.

4. A data transfer system according to claim 1 wherein said memory means includes a random access memory and a read-only memory;
   said connecting means includes read/write data distributing and supplying means, by which data of single or multiple word(s) read from the same addresses in said respective blocks of said random access memory is distributed and supplied to said divided bit groups of said data bus, and by which write data of single or multiple word(s) sent through said data bus is distributed and supplied to said respective blocks of said random access memory; and
   said connecting means further includes a read data distributing and supplying means, by which data of single or multiple word(s) read from the same addresses in said respective blocks of said read-only memory is distributed and supplied to said divided bit groups of said data bus.

5. A data transfer system according to claim 1 wherein said register means comprises a microprocessor system including a central processor with a data operation part.

* * * * *